(12) United States Patent
Howie, Jr.

(10) Patent No.: US 6,242,064 B1
(45) Date of Patent: Jun. 5, 2001

(54) METHOD OF ATTACHING A COVER TO A TUBULAR BODY SUCH AS A KNOB OR A BUTTON AND A KNOB OR BUTTON OF SAID METHOD

(75) Inventor: Robert K. Howie, Jr., Decatur, IL (US)

(73) Assignee: The Grigoleit Company, Decatur, IL (US)

(*) Notice: Subject to any disclaimer, the term of this patent is extended or adjusted under 35 U.S.C. 154(b) by 0 days.

(21) Appl. No.: 08/872,863

(22) Filed: Jun. 11, 1997

(51) Int. Cl.[7] .............................. B29C 45/14; B29C 70/78
(52) U.S. Cl. .............................. 428/35.7; 16/121; 16/414; 16/441; 74/553; 150/155; 264/273; 264/275; 264/318; 264/334; 292/347
(58) Field of Search .................... 428/35.7, 66.3, 428/138, 140; 16/121, 441, 414; 74/553; 150/155; 292/347; 264/273, 275, 318, 334

(56) References Cited

U.S. PATENT DOCUMENTS

| | | |
|---|---|---|
| 2,071,147 | 2/1937 | Watson .................................. 74/558 |
| 2,425,611 | 8/1947 | Frost et al. ............................ 264/273 |
| 2,921,343 * | 1/1960 | Mumford ...................... 264/DIG. 34 |
| 3,468,020 | 9/1969 | Carlson et al. ............................ 29/57 |
| 3,543,329 | 12/1970 | Gulette et al. .......................... 16/121 |
| 4,094,210 | 6/1978 | Wirtz et al. ............................. 16/121 |
| 4,165,659 | 8/1979 | Fawley .................................... 74/558 |
| 4,751,038 * | 6/1988 | Schlueter et al. ............. 264/DIG. 34 |
| 5,469,758 | 11/1995 | Howie, Jr. ............................... 74/553 |

* cited by examiner

*Primary Examiner*—Ellis Robinson
*Assistant Examiner*—Sandra M. Nolan
(74) *Attorney, Agent, or Firm*—Cook, Alex, McFarron, Manzo, Cummings & Mehler, Ltd.

(57) ABSTRACT

A composite article including a tubular body having a front end, a rear end, a peripheral wall extending between the front and rear ends, a wall support located rearwardly of the front end of the peripheral wall and at least one paragraph formed in the wall engaging support. An end cap is positioned on the front end of the tubular body to obstruct the wall engaging support except for at least a portion of at least one of the passages and to define a channel between the end cover and the peripheral wall. A plastic coating fills at least one passage in the channel and overlaps the cover to fasten the cover to the tubular body.

8 Claims, 1 Drawing Sheet

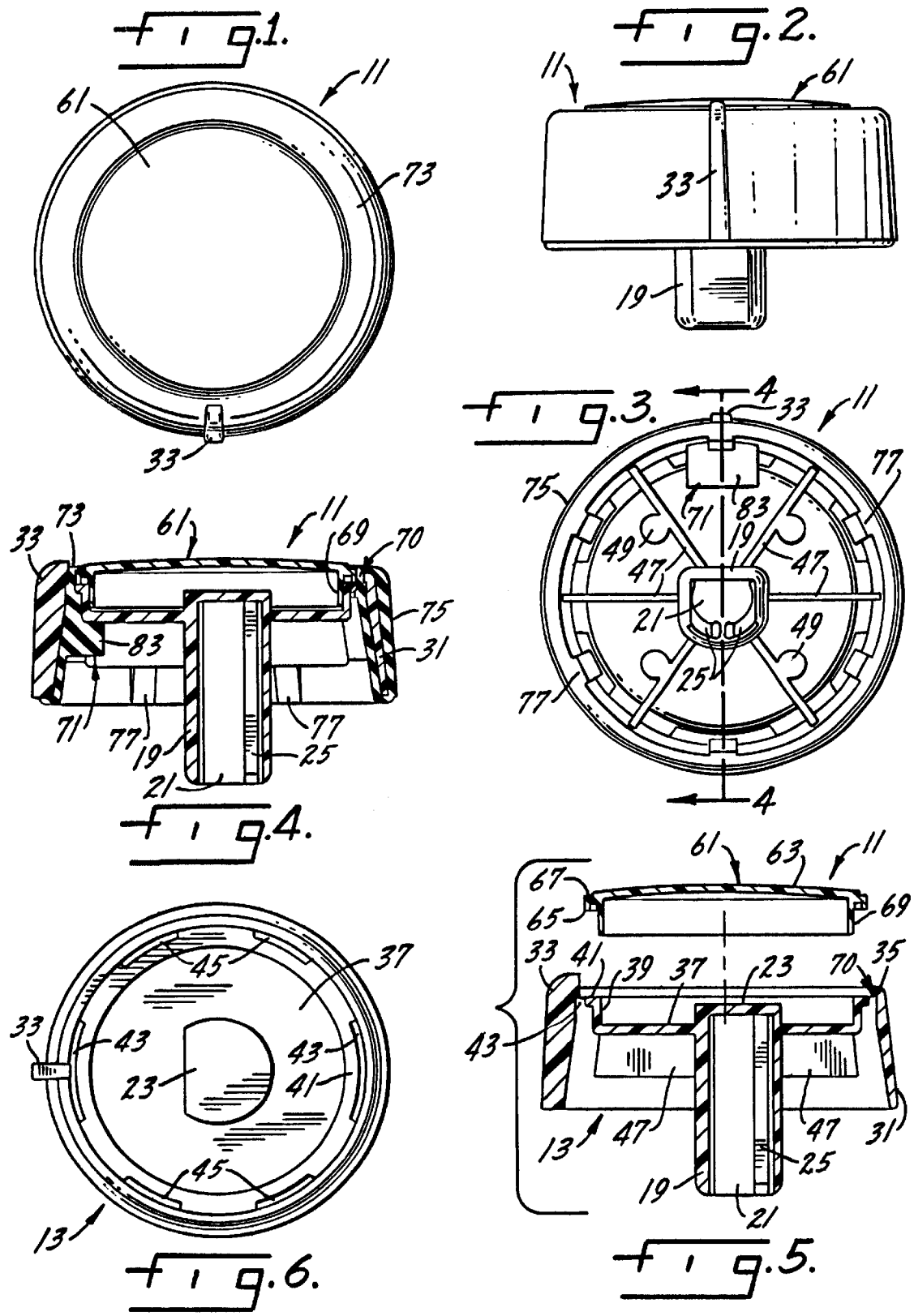

METHOD OF ATTACHING A COVER TO A TUBULAR BODY SUCH AS A KNOB OR A BUTTON AND A KNOB OR BUTTON OF SAID METHOD

BACKGROUND AND SUMMARY OF THE INVENTION

This invention is directed to a method for attaching a decorative cover to a tubular body such as a knob or a button while also applying a partial covering to the knob or button without fully obscuring the decorative cover and the resulting knob or button.

Another object of this invention is a method of applying a decorative cover to a tubular body such as a knob or button without requiring orientation of the cover circumferentially relative to the knob or button during assembly.

Another object of this invention is a method of forming a knob or button using a two shot injection molding process in which the gate for the second shot of plastic can be located at any selected position of a number of circumferential positions determined by the location of passages in a front partition wall of the knob or button.

Yet another object of this invention is a tubular body such as a knob or button having a cover which is attached to the tubular body by an annular band of plastic around its periphery which leaves the center of the cover unobscured.

Still another object of this invention is a method of attaching a cover to a tubular body by an annular ring of plastic which may be applied from the rear through at least one of the passages in the front interior wall or overflowed from the front of the cover.

An additional object of this invention is a tubular body such as a knob or button having a cover which is attached to the tubular body by plastic which covers the outer wall of the tubular body but leaves the center of the cover unobscured.

BRIEF DESCRIPTION OF THE DRAWINGS

The invention is illustrated more or less diagrammatically in the following drawings wherein:

FIG. 1 is a top plan view of a tubular body such as a knob with its attached decorative cover made in accordance with the teachings of this invention;

FIG. 2 is a side elevational view of the knob of FIG. 1;

FIG. 3 is a bottom plan view of the knob of FIG. 1;

FIG. 4 is a cross sectional view taken along line 4—4 of FIG. 3;

FIG. 5 is an exploded view of the body and cover of the knob of this invention before the application of the outer plastic layer to secure the cover to the body; and FIG. 6 is a top plan view of only the body of FIG. 5.

BRIEF DESCRIPTION OF THE PREFERRED EMBODIMENTS

FIG. 1 of the drawings shows a composite knob 11 molded in accordance with the teachings of this invention. As shown most clearly in FIGS. 4 and 5, the knob includes a body 13 which may typically be made by injection molding of a suitable plastic. The body 13 includes a hub 19 which has a socket 21 closed by a top or front wall 23. For purposes of orientation, the longitudinal end of the body near which the wall 23 is located will be described as the top or front face of the knob. The hub extends rearwardly of the body. As is conventional, gripping fingers 25 may be installed in the socket to provide a firm attachment to a shaft (not shown) which is conventionally received in the socket 21.

The body 13 also includes a peripheral skirt or wall 31 slightly tapered outwardly from the front or face end of the body to the hub or rear end of the body. A fin 33 may be molded integrally with the peripheral skirt or wall 31. The peripheral wall includes an outer rim 35 which encircles an annular partition wall 37 which is recessed slightly rearwardly of the front wall 23 of the hub. An inner peripheral wall 39 surrounds the annular partition wall 37 and terminates in a forwardly facing rim 41. A plurality of arcuate passages 43 and 45 are formed in the rim 41 and are spaced circumferentially around this rim with the pair of diametrically opposite passages 43 having greater arcuate extents than the other passages 45. Ribs 47 located under the annular partition wall 37 extend from the hub 19 to the peripheral skirt and are spaced so that the arcuate passages 43 and 45 are located between ribs. Knockout posts 49 molded into the ribs 47 extend from the bottom of the annular partition wall 37 to the rear or bottom edges of the ribs 47.

A cover 61, which may be formed of an injection molded plastic, includes a top or end wall 63, a downwardly or rearwardly facing rim 65, a notch 67 formed peripherally between the end wall 63 and the rim 65 and a depending skirt 69. The rim 65 of the cover is dimensioned so that when the cover 61 is seated on the body 13, as shown in FIG. 4 of the drawings, the rim will cover most of the annular partition wall 37 and rim 41 but will not obstruct the arcuate passages 43 and 45. The cover 61 may alternately be formed of a metal, such as an aluminum stamping.

The provision of unobstructed passages 43 and 45 in the rim 41 of the body partition wall 37 when the cover 61 is seated on the body 13 permits a soft plastic 71 to be injection molded in a second step of a two shot molding process through a selected one of the passages 43 or 45 from a sprue positioned at the hub or back side of the body 13. A channel 70 is formed between the end cover 61 and the peripheral wall 31 of the body 13 when the end cover is positioned on the body as shown in FIGS. 4 and 5 of the drawings. The soft plastic flows through the selected passage 43 or 45 to fill the peripheral notch 67 of the top wall 63 of the cover 61 with an annular covering 73 to fill the channel 70. and also flows over the outer surface of the peripheral skirt 31 of the body to form an outer covering 75. The annular covering 73 secures the cover 61 to the body 13. Soft plastic 71 reversely flows through the unselected passages 43 and 45 to form ribs 77 on the inner surface of the skirt 31 of the body to assist in securing the soft plastic 71 to the body. The tooling, which is not shown, then provides a plug 83 of soft plastic 71 to secure the cover to the knob.

Although the invention is shown embodied in a knob 11, it should be understood and appreciated that the invention is applicable to other products wherein it is desirable to attach a decorative cover, or other type of cover, to a body without defacing or obstructing the cover, particularly the center portion of the cover. For example, this invention may be used to manufacture a button of the type used to operate a control mechanism, in other words, what is conventionally referred to as a push button. Such a push button would include a tubular body such as body 13, a peripheral wall such as peripheral wall 31 and a partition such as partition wall 37. Passages, such as passages 43 and 45 would be formed in a rim such as the rim 41. A cover, such as cover 61, which may be formed of plastic or metal, would be attached to the body in the manner previously described for the attachment of cover 61. It should also be appreciated that in place of the partition wall 37, ribs such as ribs 47 may be provided with the ribs extending to the peripheral wall for strengthening. The cover may be attached by an annular band of plastic such as covering 73 which may be applied through passages between the ribs or overflowed from the cover side of the button. In the latter arrangement, the passages 43 and 45 may be omitted from the rim 41.

I claim:

1. A composite button or knob including,
    a tubular body having a front end, a rear end, a peripheral wall extending between said front and rear ends, a wall engaging support located rearwardly of said front end of said peripheral wall, at least one passage formed in said wall engaging support,
    an end cover positioned on said front end of said tubular body to obstruct said wall engaging support except for at least a portion of said at least one passage and to define a channel between said end cover and said peripheral wall, and
    a plastic coating filling said at least one passage and said channel and overlapping said cover to fasten said cover to said tubular body.

2. The composite button or knob of claim 1 in which said wall engaging support is a partition.

3. The composite button or knob of claim 1 in which said wall engaging support includes ribs.

4. The composite button or knob of claim 1 in which said wall engaging support includes a shaft receiving hub.

5. The composite button or knob of claim 1 in which said wall engaging support is a partition having ribs and includes a shaft receiving hub, and said at least one passage formed in said wall engaging support is formed in a supporting rim extending from said partition.

6. A composite knob or button including:
    a body having an outer peripheral skirt, an inner peripheral rim having passages therein and a front edge,
    an end cover located at said front edge of said peripheral skirt,
    a channel formed between said end cover and the peripheral skirt when the end cover is positioned thereon, and
    a band of plastic overlying at least a portion of said end cover and filling at least a portion of said channel and said passages to attach said end cover to said body.

7. The composite button or knob of claim 6 in which said tubular body includes a rim located adjacent said front edge of said peripheral skirt with said end cover supported on said rim.

8. A The composite button or knob of claim 6 in which said band of plastic overlying said at least a portion of said end cover also overlies said front edge of said peripheral skirt.

* * * * *